United States Patent
Sethi et al.

(10) Patent No.: US 11,789,601 B2
(45) Date of Patent: Oct. 17, 2023

(54) SYSTEM AND METHOD FOR IDENTIFYING USER INTENT USING FOUR-DIMENSIONAL COORDINATES OF AN INPUT POINTER

(71) Applicant: DELL PRODUCTS, LP, Round Rock, TX (US)

(72) Inventors: Parminder Singh Sethi, Ludhian (IN); Madhuri Dwarakanath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/674,220

(22) Filed: Nov. 5, 2019

(65) Prior Publication Data

US 2021/0132760 A1    May 6, 2021

(51) Int. Cl.
| | | |
|---|---|---|
| G06F 3/0485 | (2022.01) | |
| G06F 3/0354 | (2013.01) | |
| G06N 20/00 | (2019.01) | |
| G06N 5/04 | (2023.01) | |
| G06F 3/0487 | (2013.01) | |

(52) U.S. Cl.
CPC ........ *G06F 3/0485* (2013.01); *G06F 3/03543* (2013.01); *G06F 3/0487* (2013.01); *G06N 5/04* (2013.01); *G06N 20/00* (2019.01)

(58) Field of Classification Search
CPC .. G06F 3/0485; G06F 3/0487; G06F 3/03543; G06N 5/04; G06N 20/00
See application file for complete search history.

(56) References Cited

U.S. PATENT DOCUMENTS

| | | | |
|---|---|---|---|
| 8,635,268 B1* | 1/2014 | Otwell ................... | G06F 16/95 715/760 |
| 9,772,979 B1* | 9/2017 | Young ................. | G06F 16/9574 |
| 2002/0093652 A1* | 7/2002 | Powell ................... | G01N 21/68 356/316 |

(Continued)

OTHER PUBLICATIONS

"Get the current percentage of scroll in an element (not the document)?", Geoffrey Signorato, Oct. 24, 2017, 3 pages, https://teamtreehouse.com/community/get-the-current-percentage-of-scroll-in-an-elementnot-the-document (Year: 2017).*

(Continued)

*Primary Examiner* — Haimei Jiang
(74) *Attorney, Agent, or Firm* — Larson Newman, LLP

(57) ABSTRACT

An information handling system receives information from an input pointer, obtains a first coordinate from the information with respect to a first direction of a display, obtains a second coordinate from the information with respect to a second direction of a display screen, and obtains a third coordinate from a scrolling value representative of an amount of scrolling of a contiguous presentation of displayable information for display of a portion of the contiguous presentation of displayable information within the display. The system also obtains a fourth coordinate representative of a time at which the first coordinate and the second coordinate are obtained, and provides an unambiguous record of a user's navigation of the contiguous presentation of displayable information based on the first coordinate, the second coordinate, the third coordinate, and the fourth coordinate.

14 Claims, 6 Drawing Sheets

(56) References Cited

U.S. PATENT DOCUMENTS

| | | | | |
|---|---|---|---|---|
| 2005/0278728 | A1* | 12/2005 | Klementiev | G06F 11/3414 |
| | | | | 719/328 |
| 2007/0083823 | A1* | 4/2007 | Jaeger | G06F 3/0481 |
| | | | | 715/787 |
| 2009/0282359 | A1* | 11/2009 | Saul | G06F 3/0481 |
| | | | | 715/784 |
| 2015/0012813 | A1* | 1/2015 | Naderi | G06F 16/248 |
| | | | | 715/234 |
| 2015/0066907 | A1* | 3/2015 | Somaiya | G06F 3/0482 |
| | | | | 707/722 |
| 2015/0067498 | A1* | 3/2015 | Satou | G06F 11/3672 |
| | | | | 715/704 |
| 2016/0038088 | A1* | 2/2016 | Lari | A61B 5/11 |
| | | | | 600/595 |
| 2016/0086219 | A1* | 3/2016 | Richardson | G06F 3/0485 |
| | | | | 707/728 |
| 2016/0092058 | A1* | 3/2016 | Min | G06F 3/0412 |
| | | | | 345/173 |
| 2016/0094705 | A1* | 3/2016 | Vendrow | G06V 40/19 |
| | | | | 382/103 |
| 2016/0189386 | A1* | 6/2016 | Michaelraj | G06T 7/12 |
| | | | | 382/154 |
| 2020/0005417 | A1* | 1/2020 | Agasi | G06F 40/174 |

OTHER PUBLICATIONS

"The Scroll depth trigger in google tag manager", https://www.simoahava.com/analytics/scroll-depth-trigger-google-tag-manager/, 43 pages (Year: 2017).*

* cited by examiner

SYSTEM AND METHOD FOR IDENTIFYING USER INTENT USING FOUR-DIMENSIONAL COORDINATES OF AN INPUT POINTER

FIELD OF THE DISCLOSURE

The present disclosure generally relates to information handling systems, and more particularly relates to identifying user intent using four-dimensional coordinates of an input pointer.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may receive information from an input pointer, obtain a first coordinate from the information with respect to a first direction of a display, obtain a second coordinate from the information with respect to a second direction of a display screen, and obtain a third coordinate from a scrolling value representative of an amount of scrolling of a contiguous presentation of displayable information for display of a portion of the contiguous presentation of displayable information within the display. The system may also obtain a fourth coordinate representative of a time at which the first coordinate and the second coordinate are obtained, and provide an unambiguous record of a user's navigation of the contiguous presentation of displayable information based on the first coordinate, the second coordinate, the third coordinate, and the fourth coordinate

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
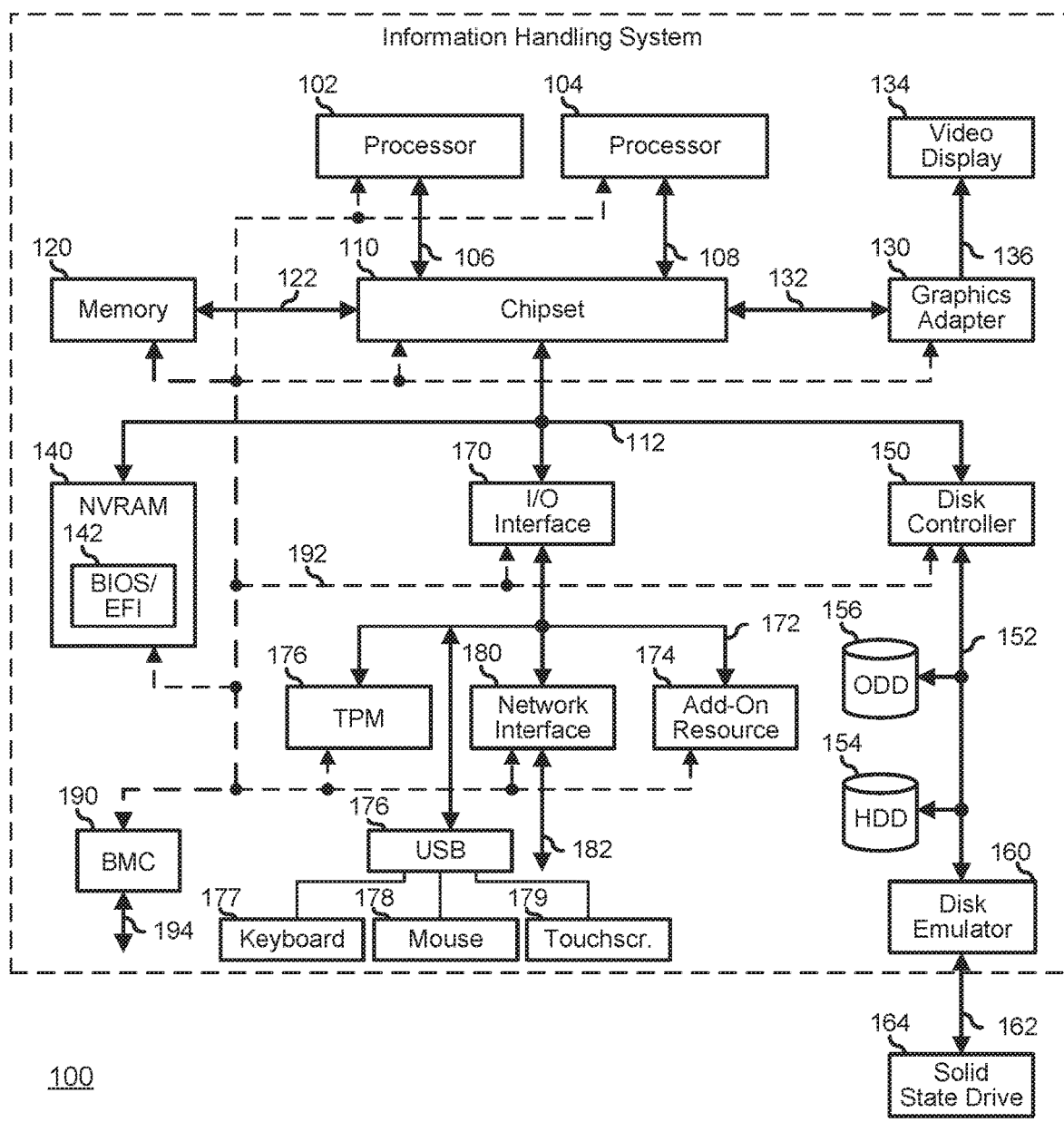
FIG. 1 is a block diagram illustrating an information handling system according to an embodiment of the present disclosure.

FIG. 1 illustrates a generalized embodiment of information handling system (IHS) 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
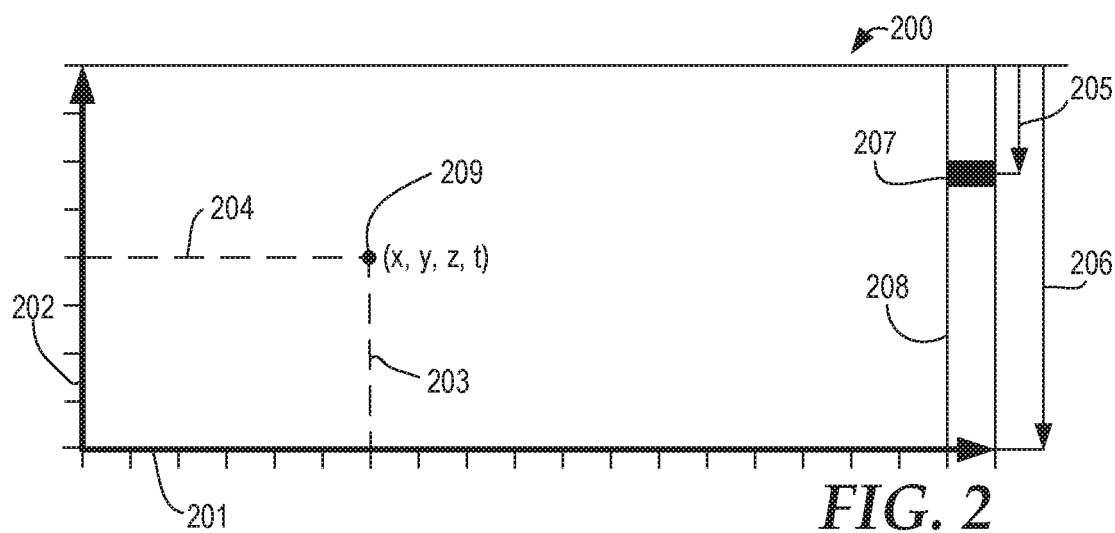
FIG. 2 is a diagram illustrating a display screen area in accordance with at least one embodiment.

FIG. 2 is an elevation view diagram illustrating a display screen area in accordance with at least one embodiment. Display screen area 200 is shown with respect to x axis 201 and y axis 202. Display area 200 comprises scroll bar trough 208 in which scroll bar thumb 207 is located. Scroll bar thumb 207 is located a scrolling distance 205 down from the top of scroll bar trough 208, which spans a scrolling range 206. Pixels may be presented on display screen area 200. For example, a pixel 209 may be presented at a location having coordinates (x, y, z, t), where the x coordinate represents a horizontal distance 203 along x axis 201, the y coordinate represents a vertical distance 204 along y axis 202, the z coordinate represents the ratio of scrolling distance 205 to scrolling range 206 (which may, for example, be expressed as a percentage), and the t coordinate represents a timestamp for a time at which an action, such as a mouse pointer positioning, with respect to the point at which the pixel is located occurs.

Figure 3:
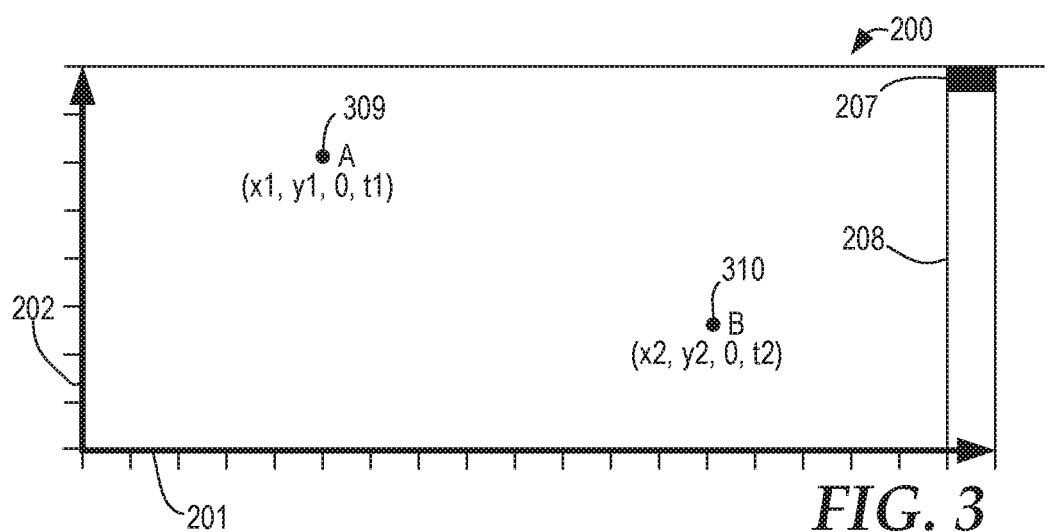
FIG. 3 is a diagram illustrating a display screen area in accordance with at least one embodiment.

FIG. 3 is an elevation view diagram illustrating a display screen area in accordance with at least one embodiment. In the illustrated example of display screen area 200, scroll bar thumb 207 is shown as being located at the top of scrolling range 206. Scroll bar thumb 207 may appear at the top of scrolling range 206, for example, when a web page is initially loaded and no scrolling down the web page has yet occurred, or, as another example, when a user has scrolled back up to the top of a web page. Pixel A 309 is shown at coordinates (x1, y1, 0, t1), as pixel A 309 is a horizontal distance x1 along x axis 201, a vertical distance y1 along y axis 202, with zero percent scrolling along scrolling range 206 as its z coordinate, and with a timestamp t1 denoting a first time as its t coordinate. Pixel B 310 is shown at coordinates (x2, y2, 0, t2), as pixel B 310 is a horizontal distance x2 along x axis 201, a vertical distance y2 along y axis 202, with zero percent scrolling along scrolling range 206 as its z coordinate, and with a timestamp t2 denoting a second time as its t coordinate. In this case, both pixel A 309 and pixel B 310 have zero for their z coordinate, as either no scrolling has yet occurred or the user has scrolled the contiguous presentation of displayable information back to the top of its scrolling range.

Figure 4:
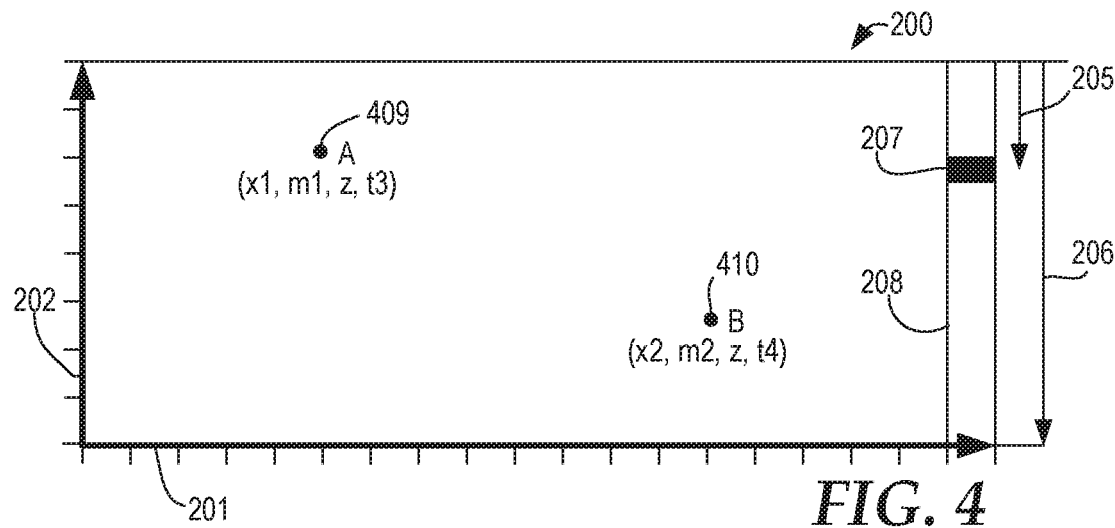
FIG. 4 is a diagram illustrating a display screen area in accordance with at least one embodiment.

FIG. 4 is an elevation view diagram illustrating a display screen area in accordance with at least one embodiment. In the illustrated example of display screen area 200, scroll bar thumb 207 is shown as being located a scrolling distance 205 down from the top of scrolling range 206. Scroll bar thumb 207 may appear at the illustrated location along scrolling range 206, for example, when a web page has been scrolled downward after its initial loading, or, as another example, when a user has scrolled back up after having scrolled further down the web page. Pixel A 409 is shown at coordinates (x1, m1, z, t3), as pixel A 409 is a horizontal distance x1 along x axis 201, a vertical distance m1 along y axis 202, with z percent scrolling along scrolling range 206 as its z coordinate, and with a timestamp t3 denoting a third time as its t coordinate. Pixel B 410 is shown at coordinates (x2, m2, z, t4), as pixel B 410 is a horizontal distance x2 along x axis 201, a vertical distance m2 along y axis 202, with z percent scrolling along scrolling range 206 as its z coordinate, and with a timestamp t4 denoting a fourth time as its t coordinate. In this case, both pixel A 409 and pixel B 410 have a value z for their z coordinate, as pixel A 409 and pixel B 410 are being displayed after the contiguous presentation of displayable information has been scrolled z percent through its scrolling range. Since all of the locations within display screen area 200 can display a respective pixel of a portion of the contiguous presentation of displayable information for a particular scrolling value, all of the locations within display screen area 200 can be denoted by the same z coordinate for the particular scrolling value. As scrolling is performed to a different scrolling value, that different scrolling value can then be applied as the z coordinate for all locations within display screen areas 200. The ability to apply that different scrolling value to all locations without further calculation when the scrolling has stopped at the different scrolling value provides efficiency in processing large numbers of locations within display screen area 200.

Figure 5:
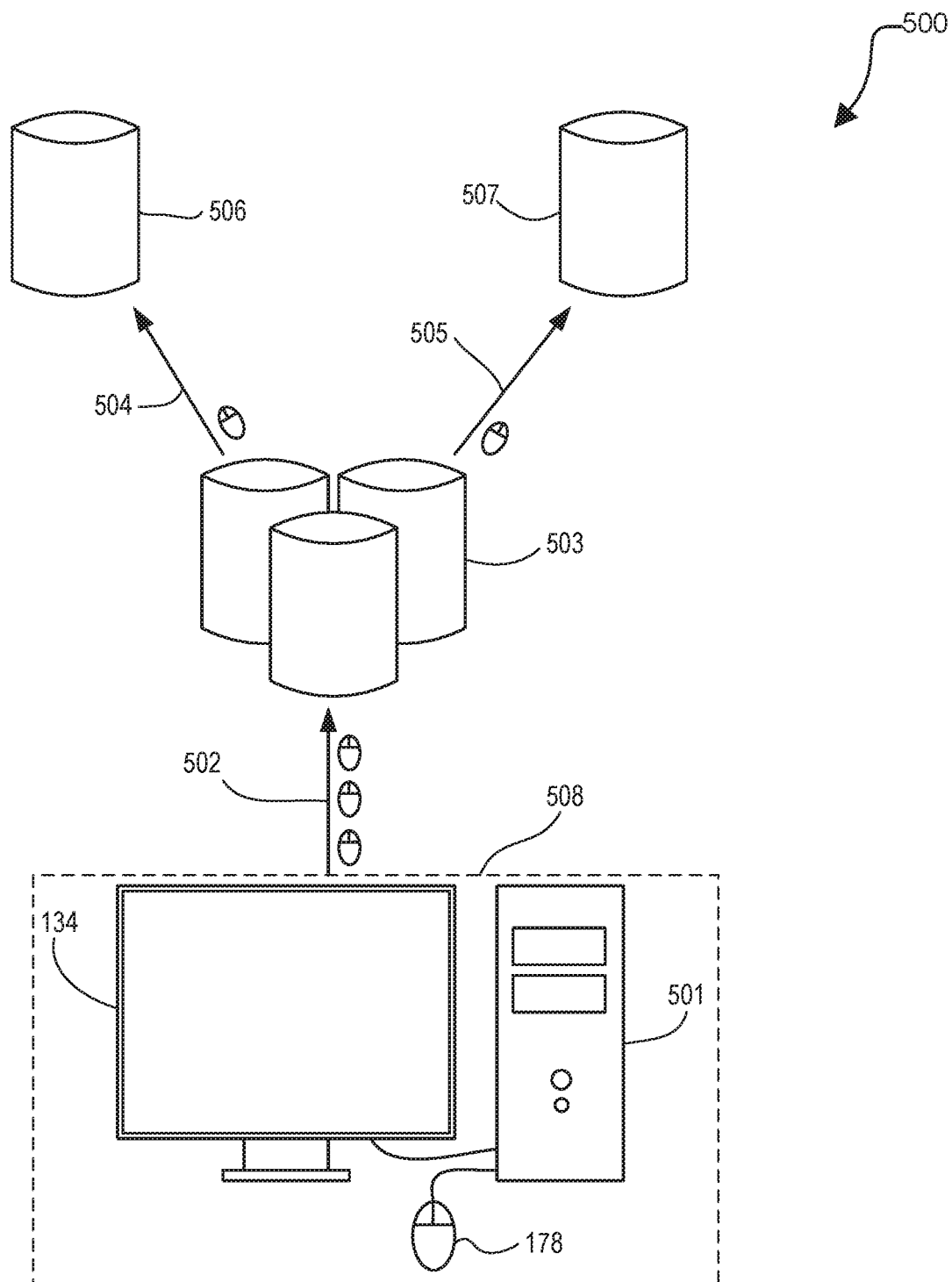
FIG. 5 is a block diagram illustrating a system for processing mouse pointer information in accordance with at least one embodiment.

FIG. 5 illustrates a system for processing mouse pointer information in accordance with at least one embodiment. System 500 comprises a client IHS 508, a classification engine 503, a search context feature database 506, and an interaction feature database 507. Client IHS 508 comprises a computer 501, a mouse 178, and a video display 134. As an example, computer 501 may be implemented according to IHS 100 of FIG. 1, with mouse 178 and video display 134 of FIG. 1 shown explicitly in FIG. 5. Computer 501 obtains mouse input information from mouse 178. For example, the mouse input information can include a first axis motion component indicating motion of the mouse with respect to a first axis and a second axis motion component indicating motion of the mouse with respect to a second axis. As an example, the second axis can be orthogonal to the first axis. The mouse input information can also include indications of clicking one or more buttons on the mouse. Client IHS 508 (such as computer 501) provides mouse movement data to classification engine 503 via connection 502.

Classification engine 503 receives the mouse movement data and creates a mouse trajectory. The mouse trajectory shows, for example, a location, direction, and speed of the mouse movement based on the mouse movement data. From the mouse trajectory, a mouse traverse path can be constructed showing the path traversed by the mouse pointer based on the mouse movement data. The mouse traverse path is split into segments, and features associated with each segment are determined.

Figure 6:
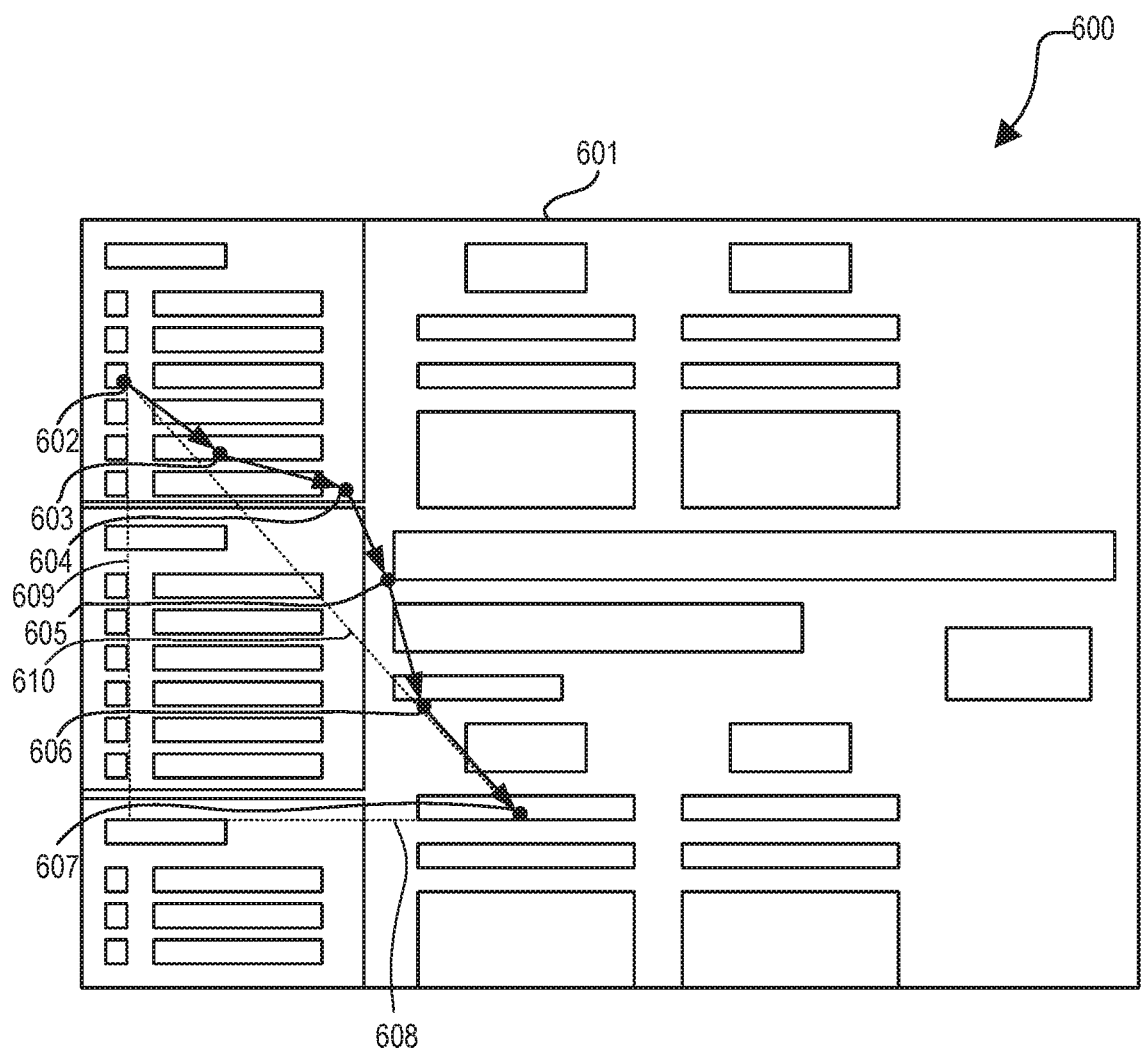
FIG. 6 is a flow diagram illustrating a method of obtaining four dimensional (4D) coordinates, analyzing the 4D coordinates, and predicting user intent in accordance with at least one embodiment.

FIG. 6 is an elevation view diagram illustrating a display screen area in accordance with at least one embodiment. Overlay 600 shows an input pointer trajectory (e.g., a mouse trajectory) comprising locations 602, 603, 604, 605, 606, and 607 in relation to display screen area 601. In the illustrated example, the indicator pointer (e.g., mouse pointer) information begins at location 602 with coordinates (x1, y1, z1, t1) and shows movement to location 603 with coordinates (x2, y2, z2, t2), then to location 604 with coordinates (x3, y3, z3, t3), then to location 605 with coordinates (x4, y4, z4, t4), then to location 606 with coordinates (x5, y5, z5, t5), then to location 607 with coordinates (x6, y6, z6, t6). The trajectory can be analyzed in segments, such as a first segment from location 602 to location 603, a second segment from location 603 to location 604, a third segment from location 604 to location 605, a fourth segment from location 605 to location 606, and a fifth segment from location 606 to location 607. The trajectory can also be analyzed over a plurality of locations, for example, yielding a horizontal range 608, a vertical range 609, and a slope 610 from location 602 to location 607.

Referring back to FIG. 5, classification engine 503 provides the mouse trajectory information to search context feature database 506 via connection 504 and to interaction feature database 507 via connection 505. The search context features and the interaction features may be, for example, related to content on a web page, such as a search results page and interaction of a user, such as scrolling with respect to such content. By determining the features, classification into categories using machine learning (ML) classification technique can yield a prediction of a user's intent during the user's navigation of the content, as exemplified by the mouse movement data. By predicting a user's intent, a search engine can predict whether an individual is intent on buying an item, such as a product or service, or whether the user is browsing without a commercial goal.

As used herein, an input pointer includes not only a mouse pointer showing a location indicated by input received from a mouse but also can include one or more of indicia of a location with respect to a display received from an input device, such as a touch screen, an optical tracking system (such as an optical gesture tracking system, an optical eye tracking system, an optical head motion tracking system, or the like), a virtual reality (VR) input system, an augmented reality (AR) input system, a cinematic reality (CR) input system, a mixed reality (MR) tracking system, a cross reality (XR) tracking system, or the like.

Figure 7:
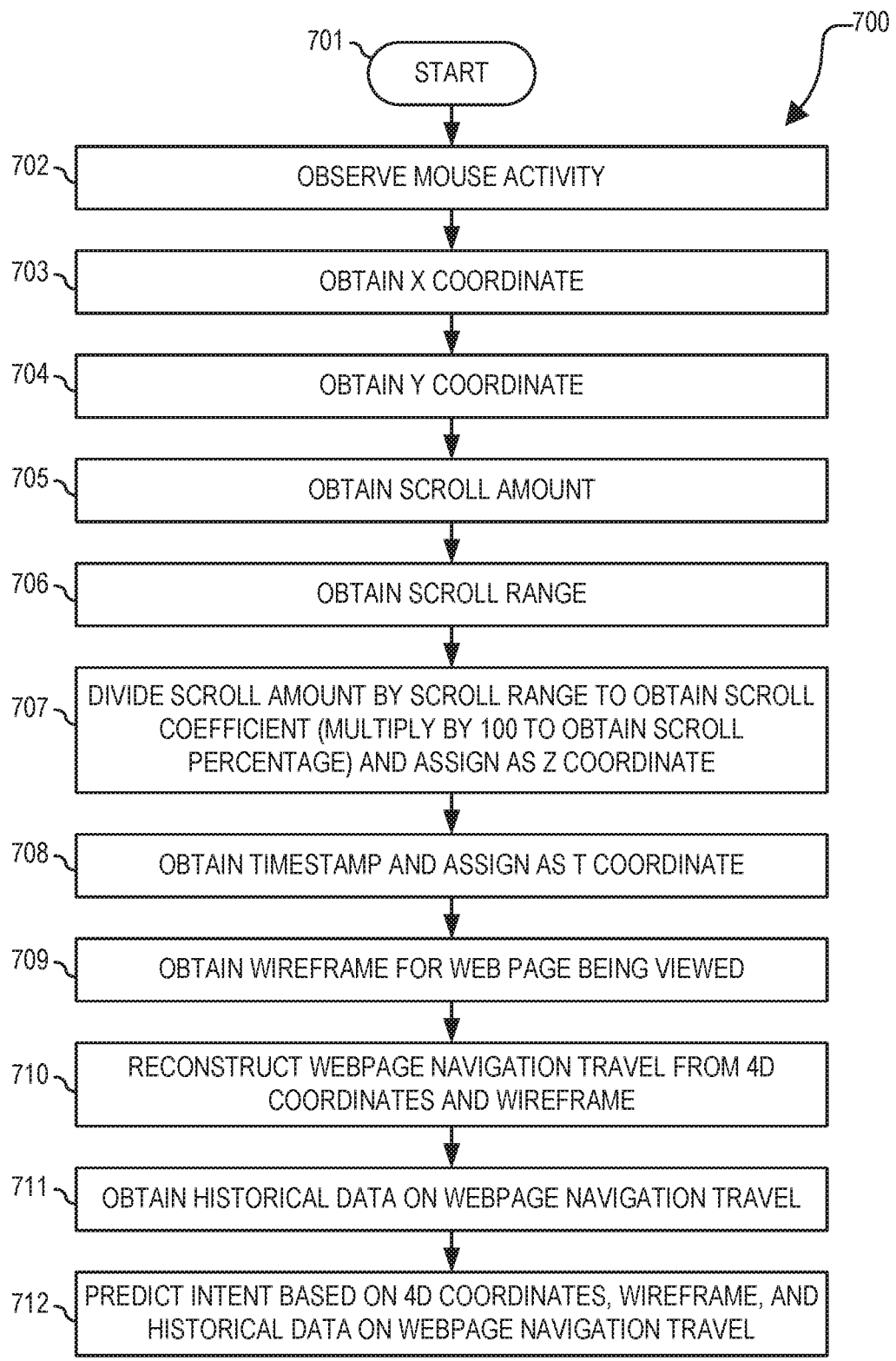
FIG. 7 is a flow diagram illustrating a method of obtaining 4D coordinates in accordance with at least one embodiment.

FIG. 7 illustrates a method of obtaining 4D coordinates, analyzing the 4D coordinates, and predicting user intent in accordance with at least one embodiment. Method 700 begins at block 701 and continues to block 702. At block 702, mouse activity is observed. From block 702, method 700 continues to block 703. At block 703, an x coordinate is obtained based on a horizontal distance of a pixel indicated by a mouse pointer based on the observed mouse activity. From block 703, method 700 continues to block 704.

At block 704, a y coordinate is obtained based on a vertical distance of a pixel indicated by a mouse pointer based on the observed mouse activity. From block 704, method 700 continues to block 705. At block 705, a scroll amount is obtained based on a scroll distance of a scroll bar thumb along a scroll bar trough. From block 705, method 700 continues to block 706. At block 706, a scroll range is obtained based on a length of the scroll bar trough. From block 706, method 700 continues to block 707. At block 707, the scroll amount is divided by the scroll range to obtain a scroll coefficient. As an example, the scroll coefficient may be multiplied by 100 to obtain a scroll percentage.

At block 707, the scroll coefficient (such as the scroll percentage, the value from which it may be obtained, or the like) is assigned as a z coordinate. From block 707, method 700 continues to block 708. At block 708, a timestamp is obtained and assigned as a t coordinate. From block 708, method 700 continues to block 709. At block 709, a wireframe for the content (such as web page) being viewed is obtained. From block 709, method 700 continues to block 710. At block 710, webpage navigation travel is reconstructed from the 4D coordinates and from the wireframe. From block 710, method 700 continues to block 711. At block 711, historical data on webpage navigation travel is obtained. From block 711, method 700 continues to block 712. At block 712, user intent is predicted based on 4D coordinates, wireframe, and historical data on webpage navigation travel.

Figure 8:
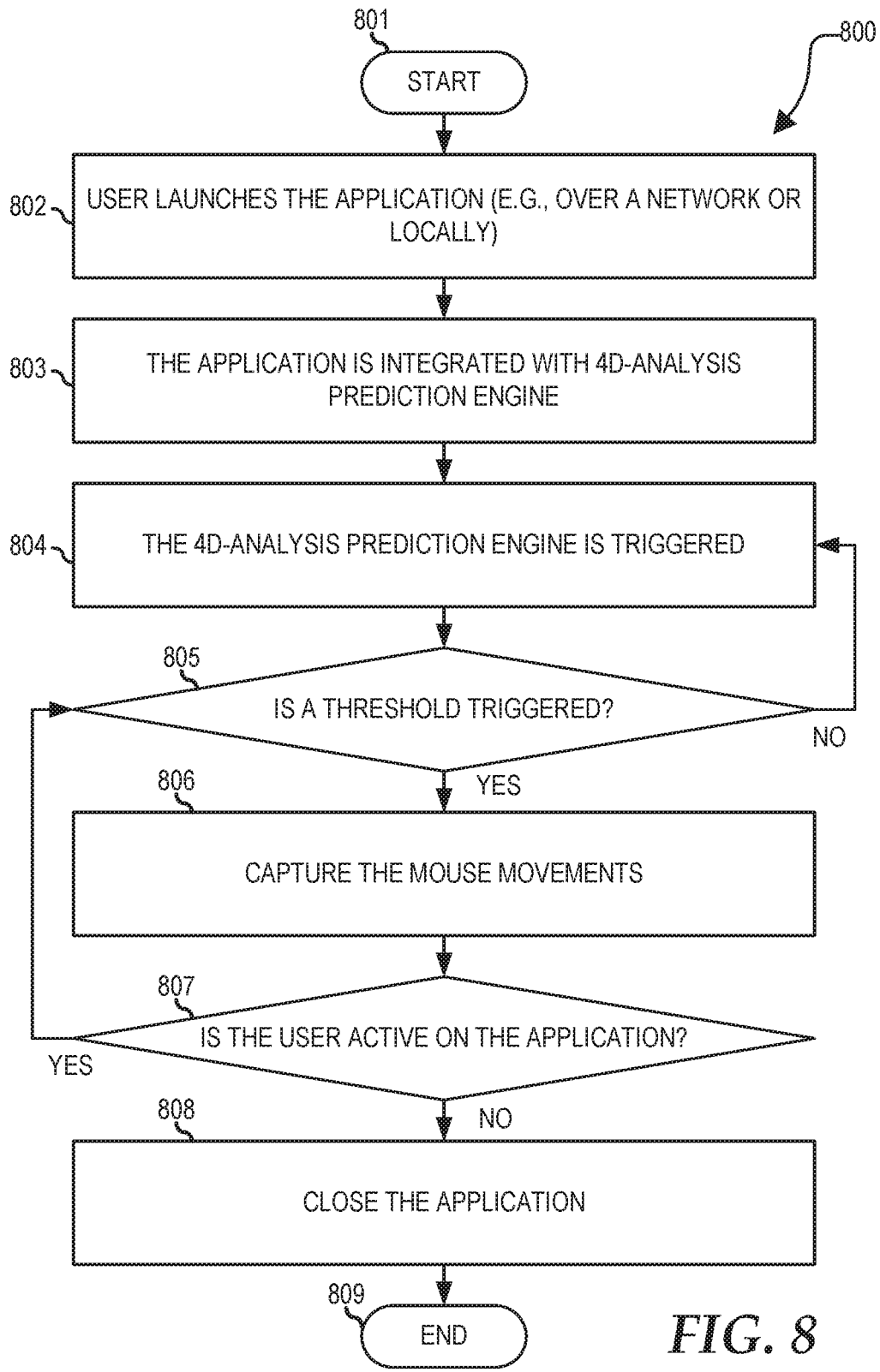
FIG. 8 shows a method of obtaining 4D coordinates in accordance with at least one embodiment in accordance with at least one embodiment.

FIG. 8 shows a method of obtaining 4D coordinates in accordance with at least one embodiment. Method 800 begins in block 801 and continues to block 802. At block 803, an application is launched. The application may be launched, for example, by a user. The application may be launched, as examples, over a network or locally. From block 802, method 800 continues to block 803. At block 803, the application is integrated with a 4D-analysis prediction engine. From block 803, method 800 continues to block 804. At block 804, the 4D-analysis prediction engine is triggered.

From block 804, method 800 continues to decision block 805. At decision block 805, a decision is made as to whether or not a threshold has been triggered. If not, method 800 returns to block 804. If so, method 800 continues to block 806. At block 806, mouse movements are captured. From block 806, method 800 continues to decision block 807. At decision block 807, a decision is made as to whether or not the user is active on the application. If so, method 800 returns to decision block 805. If not, method 800 continues to block 808. At block 808, the application is closed. From block 808, method 800 continues to block 809, where it ends.

Many business decisions depend on the mouse movements and events resulting from an action by a user. To make accurate business decisions, accurate capture of the user's mouse movements is useful and valuable. A frequently used approach to capture mouse movements is to capture the screen coordinates of the mouse at different positions. However, such an approach uses the system (such as laptop or desktop) boundary as the axis and then captures the screen coordinates.

In that case, two or more different pixels within the information being displayed (such as web page, document, image, or other contiguous presentation of information, a portion of which is being visibly displayed) have the same screen coordinates because of the scrolling action, which causes those different pixels to be displayed at the same point on a display as a user scrolls through the information. The similar labeling of the different pixels being at the same point on the display introduces ambiguity to a data set collected from an input pointer. Therefore, the accuracy of the collected screen coordinates decreases.

For example, assume that the x coordinate and y coordinate values at a certain point on a display screen are recorded. However, when scrolling occurs, the pixel being displayed at that point is replaced by another pixel. Therefore, these two distinct pixels tend to be confusingly identified as the same point, having the same x,y values, on the display screen if further information is not provided.

These values may then be analyzed, for example, by the backend of a computing infrastructure. If a business decision were dependent on these screen coordinate values, without supplemental information to reflect the effect of the scrolling, inaccuracy of the values could result in an incorrect business decision.

In accordance with at least one embodiment, a pixel within a scrollable layout capable of being displayed to a user can be unambiguously identified using four-dimensional (4D) coordinates. The 4D coordinates can include the following four values: an x coordinate, a y coordinate, a z coordinate (such as scroll factor), and a time coordinate (such as in milliseconds). To calculate the x coordinate and y coordinate values, the display boundary (such as of a desktop, laptop, tablet, phone, etc.) as x and y axes. As an example, the x coordinate and y coordinate values can be calculated in form of percentages of screen size.

$$X \text{ coordinate} = (\text{value at } x \text{ axis})/(\text{horizontal length of screen})*(100)$$

$$Y \text{ coordinate} = (\text{value at } y \text{ axis})/(\text{vertical length of screen})*(100)$$

The time coordinate is a timestamp of a system of time, such as the current local time, at the point in time at which the mouse cursor is currently placed at the observed location identified by the spatial coordinates.

The z coordinate represents the amount of scrolling done by the user on a contiguous presentation of displayable information (such as a webpage, a graphic user interface (GUI) within an application, or the like) through which a user may scroll. A scroll factor upon which the z coordinate is based can be calculated for any screen resolution (from for example a 5-inch phone to, for example, a 4 k screen).

In accordance with at least one embodiment, a mouse scroll movement is reverse to the page movement. That is, if the mouse is scrolled downwards, then the page moves upwards. On the contrary, another type of user input device, such as may provide an input pointer in a VR, AR, CR, MR, or XR context, may result in scrolling in the same direction as the movement detected by the user input device. Accordingly, scrolling in one direction may result from different directions of movement detected by different user input devices. Nonetheless, at least one embodiment can provide a z coordinate independent of the direction of movement detected by different user input devices (such as independent of whether upward movement indicates downward scrolling or downward movement indicates downward scrolling).

In accordance with at least one embodiment, a webpage is loaded on a display screen. The x and y values are calculated by using the screen size and the boundary of the display screen (such as desktop, laptop, tablet, phone display screen, or the like). When the page is loaded, the values of z coordinate are zero, because the page has not been scrolled. Note that, at any point, in a single frame (before or between instances of scrolling), the value of z coordinate is always the same. Therefore, a single value of the z coordinate can be used for every point within that single frame (for example, for either of points A and B shown in FIG. 3 or points A and B shown in FIG. 4) without need for recalculation of the z coordinate for each point within the single frame. The commonality of a single z coordinate for a plurality of points in a single frame optimizes performance.

To better understand at least one embodiment, one can assume that a user scrolled down the page. Because of the scroll, the points A and B move upwards. The value of the y coordinate changes, whereas the x coordinate value remains the same because the scrolling, in this example, is only vertical scrolling. To calculate the value of the z coordinate, the value of the y coordinate can be captured at any point on the frame. The value of z for point A will be equal to (m1-y1)/h*100%, where y1 is the y coordinate value before the scrolling, m1 is the y coordinate value after the scrolling, and h is the height of the display screen.

In accordance with at least one embodiment, a method for tracking input pointer movement with respect to pixels of a contiguous presentation of displayable information that span a range beyond dimensions of a display screen, wherein the pixels can be uniquely identified using 4D coordinates. An efficient technique is provided to capture the 4D values (such as x coordinate, y coordinate, time, and scroll percentage) of different input pointer events, such as mouse pointer events. The data accuracy and generalized applicability of at least one embodiment described herein can provide a single trusted source of data for other tasks such as finding a user's intent on the different applications or tracking a user's journey.

As an example, at least one embodiment described herein can be used by applications that run on a gadget. For example, at least one embodiment can be used on mobile phones, laptops, and so on. A coordinate collection process can be merged into system management data collection process that reaches a backend server for consolidated management of information collected from the operation of a system. Therefore, analysis can be done on collection reports so obtained to derive business use cases from the collected data.

To serve a user's needs, it is useful to understand the intent of a user as the user interacts with an IHS. While detection a user's actual selections (such as adding products or services to a virtual shopping cart to make a purchase) during the user's navigation of information may be performed during a user's interaction, for example, with a website, other information besides the user's actual selections can be obtained from the user's interaction, for example, the user's journey across the features of the website or within a particular web page of the website. Such information can be analyzed to discern a user's intent during the interaction. Information bearing upon a user's intent can be used to tailor the user's experience to be more relevant to the user's intent.

As an example, it can be important for a vendor to distinguish between individuals who are searching for and intending to purchase products or services and individuals who are browsing a web page without any specific commercial goal. Individuals searching for products or services may be responsive to targeted and conceptual advertising, whereas individuals browsing without any specific commercial goal may be served in other ways. Tailoring interaction to be responsive to a user's intent can allow a vendor to reach potential customers and inform, educate, influence, and remind the potential customers about relevant products, services, or businesses.

It has been a challenge to identify if an individual who is viewing a particular product web page is going to purchase the product they are viewing or if the individual is just viewing the web page without any specific commercial goal. Typically, search engines are the starting point for individuals to begin searching for products or services. Advertisers take advantage of this and may pay for selected keywords that are linked to their campaigns. However, it is difficult for advertisers to understand an individual's mindset in an online environment. This in turn makes it difficult for advertisers to choose the most appropriate type of advertising method for their campaigns.

To determine the success of an advertisement campaign, a click-through rate may be determined that calculates the number of times an advertisement is clicked divided by the number of times the advertisement is shown. A higher click-through rate indicates that the campaign is more successful, whereas a lower click-through rate indicates that the campaign may not be targeted to the correct set of individuals. However, these click-through rates do not provide detailed information about users' interaction with the search page. These abandoned unclicked advertisements are highly indicative of a user's intent. However, click-through rates and other measurement techniques cannot compute an individual's interests from unclicked advertisements.

While advertising click-through rates are used to determine the success of an advertising campaign, the inability of click-through rates to discern a user's intention and the user's behavior in an online environment has limited their accuracy. By providing a method for discerning a user's intention using input pointer information, it is possible to characterize an individual as either viewing a particular product web page with the intent to purchase the product they are viewing or viewing the web page without any specific commercial goal. Evidence suggestive of a user's intention can be obtained from the user's movement of an input pointer, such as a mouse pointer, made within a user interface, such as a graphic user interface (GUI).

In accordance with at least one embodiment, an application is integrated with a method disclosed herein to analyze 4D coordinate values and to discern a user's intent in navigating the presented information. As examples, a user may use a web application or a desktop application. The application can automatically download the response content for a request made by the user. This response content can also be used to fetch input pointer information, such as information regarding mouse movements.

The application can be triggered and can gather data related to the user's interaction. As an example, different mouse movements can be captured as input pointer information, which can be expressed as 4D coordinates, as described herein. Each time the user moves the mouse by a pixel (or performs other events like a page scroll, etc.), a mouse event can be triggered. As soon as a mouse event is triggered, coordinates of the mouse (e.g., 4D coordinates) are obtained, and this coordinate data is saved for further analysis.

The next step is to determine if a threshold is triggered. This threshold can vary from application to application because, for applications like system management applications, there are limited mouse movements when compared to web pages, which are typically rich in content. Thus, different thresholds can be set depending on the type of application and the user's propensity for mouse movements while interacting with the application.

If the triggering of a threshold has occurred, input pointer information, such as mouse movement, is captured. This input pointer information is captured as a string stored in a buffer on the user local device. Once the buffer's threshold is reached, the complete string is forwarded to the engine where the string is classified.

In accordance with at least one embodiment, a user's journey within a contiguous presentation of displayable information can be preserved and recreated without taking any screen shots. Collection of 4D coordinates representative of input pointer information can provide unambiguous landmarks of fine resolution to record the user's journey even if the user causes scrolling of the displayable information presented on a display screen. For processing and analysis of the recorded information, the user's journey can be recreated, for example, at a backend processor, using already created wireframes in conjunction with the recorded information comprising the 4D coordinates representative of input pointer information. Using the collected coordinates from large numbers of devices and the actions taken by large numbers of users along their large numbers of journeys, the likely actions, and therefore the intent, of a user can be predicted based on patterns of actions observed of users proceeding along similar journeys. Using the same, tailor-made offers can be presented to customers on the basis of the user journey or with respect to the user's mindset, as estimated based on the discerning of the user's intent. As an example, machine learning (ML), which may be implemented, for example, using artificial neural networks (ANNs), can be used to characterize the user's journey with respect to training the ANNs have received from the large numbers of other users' journeys, including information as to purchases those other users made during their journeys. Such characterization can include an estimation of a likelihood that the user whose journey (or partial journey) is being scrutinized has a commercial intent to purchase one or more products or services (as opposed to a non-commercial intent not to make a purchase). Moreover, the specific goods and services purchased by the other users during their journeys can guide the prediction to include a prediction of what category or specific item of goods or services the user may intend to purchase.

In accordance with at least one embodiment, a method comprises receiving input pointer information from an input pointing device; obtaining a first coordinate from the input pointer information with respect to a first direction of a display screen; obtaining a second coordinate from the input pointer information with respect to a second direction of a display screen; obtaining a third coordinate from a scrolling value representative of an amount of scrolling of a contiguous presentation of displayable information for display of a portion of the contiguous presentation of displayable information within the display screen; obtaining a fourth coordinate representative of a time at which the first coordinate and the second coordinate are obtained; and providing an unambiguous record of a user's navigation of the contiguous presentation of displayable information based on the first coordinate, the second coordinate, the third coordinate, and the fourth coordinate. In accordance with at least one embodiment, the obtaining the third coordinate comprises dividing a scroll amount by a scroll range. In accordance with at least one embodiment, the obtaining the third coordinate further comprises multiplying a quotient of the scroll amount divided by the scroll range to obtain the scroll value. In accordance with at least one embodiment, the method further comprises obtaining a wireframe representation for the contiguous representation of displayable information; and reconstructing the unambiguous record of the user's navigation of the contiguous presentation of displayable information based on the wireframe representation and the first coordinate, the second coordinate, the third coordinate, and the fourth coordinate. In accordance with at least one embodiment, the method further comprises obtaining historical navigation data for the contiguous presentation of displayable information; and predicting user intent based on the wireframe representation, the first coordinate, the second coordinate, the third coordinate, the fourth coordinate, and the historical navigation data. In accordance with at least one embodiment, the method further comprises obtaining historical navigation data for the contiguous presentation of displayable information; and predict user intent based on the first coordinate, the second coordinate, the third coordinate, the fourth coordinate, and the historical navigation data. In accordance with at least one embodiment, the input pointer device is a mouse device.

In accordance with at least one embodiment, an information handling system comprises an input pointer device; a display screen; and a processor coupled to the input pointer device and to the display screen, wherein the processor is configured to receive input pointer information from an input pointing device, to obtain a first coordinate from the input pointer information with respect to a first direction of a display screen, to obtain a second coordinate from the input pointer information with respect to a second direction of a display screen, to obtain a third coordinate from a scrolling value representative of an amount of scrolling of a contiguous presentation of displayable information for display of a portion of the contiguous presentation of displayable information within the display screen, to obtain a fourth coordinate representative of a time at which the first coordinate and the second coordinate are obtained, and to provide an unambiguous record of a user's navigation of the contiguous presentation of displayable information based on the first coordinate, the second coordinate, the third coordinate, and the fourth coordinate. In accordance with at least one embodiment, the processor obtains the third coordinate by dividing a scroll amount by a scroll range. In accordance with at least one embodiment, the processor obtains the third coordinate by multiplying a quotient of the scroll amount divided by the scroll range to obtain the scroll value. In accordance with at least one embodiment, the processor obtains a wireframe representation for the contiguous representation of displayable information and reconstructs the unambiguous record of the user's navigation of the contiguous presentation of displayable information based on the wireframe representation and the first coordinate, the second coordinate, the third coordinate, and the fourth coordinate. In accordance with at least one embodiment, the processor obtains historical navigation data for the contiguous presentation of displayable information and predicts user intent based on the wireframe representation, the first coordinate, the second coordinate, the third coordinate, the fourth coordinate, and the historical navigation data. In accordance with at least one embodiment, the processor obtains historical navigation data for the contiguous presentation of displayable information and predicts user intent based on the first coordinate, the second coordinate, the third coordinate, the fourth coordinate, and the historical navigation data. In accordance with at least one embodiment, the input pointer device is a mouse device.

In accordance with at least one embodiment, a method comprises receiving input pointer information from an input pointing device; obtaining a first coordinate from the input pointer information with respect to a horizontal axis of a display screen; obtaining a second coordinate from the input pointer information with respect to a vertical axis of a display screen; obtaining a third coordinate from a scrolling value representative of an amount of scrolling in a vertical direction of a contiguous presentation of displayable information for display of a portion of the contiguous presentation of displayable information within the display screen; obtaining a fourth coordinate representative of a time at which the first coordinate and the second coordinate are obtained; and providing an unambiguous record of a user's navigation of the contiguous presentation of displayable information based on the first coordinate, the second coordinate, the third coordinate, and the fourth coordinate. In accordance with at least one embodiment, the obtaining the third coordinate comprises dividing a scroll amount by a scroll range. In accordance with at least one embodiment, the obtaining the third coordinate further comprises multiplying a quotient of the scroll amount divided by the scroll range to obtain the scroll value. In accordance with at least one embodiment, the method further comprises obtaining a wireframe representation for the contiguous representation of displayable information; and reconstructing the unambiguous record of the user's navigation of the contiguous presentation of displayable information based on the wireframe representation and the first coordinate, the second coordinate, the third coordinate, and the fourth coordinate. In accordance with at least one embodiment, the method further comprises obtaining historical navigation data for the contiguous presentation of displayable information; and predicting user intent based on the wireframe representation, the first coordinate, the second coordinate, the third coordinate, the fourth coordinate, and the historical navigation data. In accordance with at least one embodiment, The method further comprises obtaining historical navigation data for the contiguous presentation of displayable information; and predicting user intent based on the first coordinate, the second coordinate, the third coordinate, the fourth coordinate, and the historical navigation data.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling systems can also include one or more buses operable to transmit information between the various hardware components.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A method comprising:
receiving information from an input pointing device;
obtaining a first coordinate from the information with respect to a first direction of a display;
obtaining a second coordinate from the information with respect to a second direction of the display;

obtaining a third coordinate from a scrolling value representative of a ratio of scrolling distance in a vertical direction of a contiguous presentation of displayable information for display to a scroll range of the contiguous presentation of displayable information within the display, wherein the scrolling distance is from top of a scroll bar trough to a location of a scroll bar thumb, wherein the scroll bar spans the scroll range;

obtaining a fourth coordinate representative of a time at which a cursor of the input pointing device is currently placed at the first coordinate and the second coordinate are obtained;

providing a location of a user's navigation of the contiguous presentation of displayable information, wherein the location is represented by a pixel having coordinates including the first coordinate, the second coordinate, the third coordinate, and the fourth coordinate, wherein no two or more different locations within the contiguous presentation of displayable information have an identical combination of values of the first coordinate, the second coordinate, the third coordinate, and the fourth coordinate, and wherein locations within a display screen area have the same third coordinate;

obtaining a wireframe representation for the contiguous presentation of displayable information;

reconstructing the user's navigation of the contiguous presentation of displayable information based on the wireframe representation and the first coordinate, the second coordinate, the third coordinate, and the fourth coordinate;

obtaining historical navigation data for the contiguous presentation of displayable information; and predicting user intent based on the wireframe representation, the first coordinate, the second coordinate, the third coordinate, the fourth coordinate, and the historical navigation data.

2. The method of claim 1, wherein the scroll range is based on a length of a scroll bar trough.

3. The method of claim 1, wherein the third coordinate is zero when no scrolling has yet occurred.

4. The method of claim 1 further comprising:
wherein the third coordinate is zero when the user has scrolled the contiguous presentation of displayable information back to a top of the scroll range.

5. The method of claim 1, wherein the input pointing device is a computer mouse.

6. An information handling system comprising:
an input pointer;
a display; and
a processor coupled to the input pointer and to the display, wherein the processor is configured to receive information from the input pointer, to obtain a first coordinate from the information with respect to a first direction of a display screen, to obtain a second coordinate from the information with respect to a second direction of the display, to obtain a third coordinate from a scrolling value representative of a ratio of scrolling distance in a vertical direction of a contiguous presentation of displayable information for display to a scroll range of the contiguous presentation of displayable information within the display, wherein the scrolling distance is from top of a scroll bar trough to a location of a scroll bar thumb, wherein the scroll bar spans the scroll range, to obtain a fourth coordinate representative of a time at which a cursor of the input pointer is currently placed at a location represented by a pixel location having coordinates including the first coordinate and the second coordinate are obtained, and to provide a record of a user's navigation of the contiguous presentation of displayable information based on the first coordinate, the second coordinate, the third coordinate, and the fourth coordinate, wherein no two or more different locations within the contiguous presentation of displayable information have an identical combination of values of the first coordinate, the second coordinate, the third coordinate, and the fourth coordinate, wherein locations within an area of the display screen have the same third coordinate, wherein the processor obtains a wireframe representation for the contiguous presentation of displayable information and reconstructs the record of the user's navigation of the contiguous presentation of displayable information based on the wireframe representation and the first coordinate, the second coordinate, the third coordinate, and the fourth coordinate, and wherein the processor obtains historical navigation data for the contiguous presentation of displayable information and predicts user intent based on the wireframe representation, the first coordinate, the second coordinate, the third coordinate, the fourth coordinate, and the historical navigation data.

7. The information handling system of claim 6, wherein the scroll range is based on a length of a scroll bar trough.

8. The information handling system of claim 6, wherein the record is indicated by a mouse pointer.

9. The information handling system of claim 6, wherein the third coordinate is zero when the user has scrolled the contiguous presentation of displayable information back to a top of the scroll range.

10. The information handling system of claim 6, wherein the input pointer includes a computer mouse.

11. A method comprising:
receiving information from a computer mouse;
obtaining a first coordinate from the information with respect to a horizontal axis of a display;
obtaining a second coordinate from the information with respect to a vertical axis of the display;
obtaining a third coordinate from a scrolling value representative of a ratio of a scrolling distance in a vertical direction of a contiguous presentation of displayable information for display to a scroll range of the contiguous presentation of displayable information within the display, wherein the scrolling distance is from top of a scroll bar trough to a location of a scroll bar thumb, wherein the scroll bar spans the scroll range;
obtaining a fourth coordinate representative of a time at which a cursor of the computer mouse is currently placed at the first coordinate and the second coordinate are obtained;
providing a record of a user's navigation of the contiguous presentation of displayable information based on the location of a pixel with coordinates including first coordinate, the second coordinate, the third coordinate, and the fourth coordinate, wherein no two or more different pixels within the contiguous presentation of displayable information have an identical combination of values of the first coordinate, the second coordinate, the third coordinate, and the fourth coordinate, and wherein locations within a display screen area have the same third coordinate;
obtaining a wireframe representation for the contiguous presentation of displayable information;
reconstructing the record of the user's navigation of the contiguous presentation of displayable information based on the wireframe representation and the first coordinate, the second coordinate, the third coordinate, and the fourth coordinate;

obtaining historical navigation data for the contiguous presentation of displayable information; and predicting user intent based on the wireframe representation, the first coordinate, the second coordinate, the third coordinate, the fourth coordinate, and the historical navigation data.

12. The method of claim 11, wherein the ratio dividing the scrolling distance by the scroll range.

13. The method of claim 12, wherein the obtaining the third coordinate further includes multiplying by 100 a quotient of the scrolling distance divided by the scroll range to obtain a scroll percentage.

14. The method of claim 11, further comprising: wherein the third coordinate is zero when the user has scrolled the contiguous presentation of displayable information back to a top of the scroll range.

\* \* \* \* \*